(12) United States Patent
Faucon

(10) Patent No.: US 10,900,457 B2
(45) Date of Patent: Jan. 26, 2021

(54) MOTOR VEHICLE STARTER PINION WITH IMPROVED ACOUSTIC PERFORMANCE

(71) Applicant: Valeo Equipements Electriques Moteur, Creteil (FR)

(72) Inventor: Guy Faucon, Creteil (FR)

(73) Assignee: Valeo Equipements Electriques Moteur, Creteil (FR)

(*) Notice: Subject to any disclaimer, the term of this patent is extended or adjusted under 35 U.S.C. 154(b) by 199 days.

(21) Appl. No.: 16/082,595

(22) PCT Filed: Feb. 23, 2017

(86) PCT No.: PCT/FR2017/050404
§ 371 (c)(1),
(2) Date: Sep. 6, 2018

(87) PCT Pub. No.: WO2017/153656
PCT Pub. Date: Sep. 14, 2017

(65) Prior Publication Data
US 2019/0085811 A1    Mar. 21, 2019

(30) Foreign Application Priority Data
Mar. 9, 2016  (FR) .................................. 16 51952

(51) Int. Cl.
*F02N 15/06*     (2006.01)
*F16H 1/10*      (2006.01)
(Continued)

(52) U.S. Cl.
CPC ......... *F02N 15/062* (2013.01); *F02N 15/067* (2013.01); *F16H 1/10* (2013.01);
(Continued)

(58) Field of Classification Search
CPC ........ F02N 15/062; F02N 15/067; F16H 1/10; F16H 55/0873; F16H 55/088; F16H 55/17; F16H 55/18; F16H 2055/176; C21D 9/32
See application file for complete search history.

(56) References Cited

U.S. PATENT DOCUMENTS 4,970,908 A * 11/1990 Isozumi ................ F02N 15/046
74/7 E
8,225,690 B2 *  7/2012 Shimada ................... F16H 1/20
74/443
(Continued)

FOREIGN PATENT DOCUMENTS

DE    10 2005 027907 A1   12/2006
EP       0 271 844 A2     6/1988
(Continued)

OTHER PUBLICATIONS

International Search Report issued in PCT/FR2017/050404 dated May 29, 2017 (3 pages).
(Continued)

*Primary Examiner* — Jake Cook
*Assistant Examiner* — Gregory Robert Weber
(74) *Attorney, Agent, or Firm* — Osha Bergman Watanabe & Burton LLP

(57) ABSTRACT

The invention relates mainly to an assembly comprising: —a combustion engine ring gear having a plurality of teeth, the said ring gear being defined by a modulus and a pressure angle, —a starter comprising a pinion (31) able to engage with the said ring gear of the said combustion engine, the said pinion (31) having a plurality of teeth (42) is defined by a modulus (Mp) and a pressure angle (alpha_p), characterized in that a pinion product which is the product of the modulus (Mp) of the said pinion (31) and the cosine of the pressure angle (alpha_p) of the said pinion (31) is greater
(Continued)

than a ring-gear product equal to the product of the modulus of the said ring gear and the cosine of the pressure angle of the said ring gear.

9 Claims, 2 Drawing Sheets

(51) Int. Cl.
*F16H 55/08* (2006.01)
*F16H 55/17* (2006.01)
*F16H 55/18* (2006.01)
*F02N 11/00* (2006.01)

(52) U.S. Cl.
CPC ....... *F16H 55/088* (2013.01); *F16H 55/0873* (2013.01); *F16H 55/17* (2013.01); *F16H 55/18* (2013.01); *F02N 11/00* (2013.01); *F16H 2055/176* (2013.01)

(56) References Cited

U.S. PATENT DOCUMENTS

| | | | | |
|---|---|---|---|---|
| 8,402,659 B2* | 3/2013 | Kotthoff | ................ | B21H 5/022 |
| | | | | 29/893.3 |
| 9,249,770 B2* | 2/2016 | Mizuno | ................... | F02N 15/06 |
| 2003/0019315 A1* | 1/2003 | Tanaka | ................ | F16H 55/0806 |
| | | | | 74/462 |
| 2009/0133531 A1* | 5/2009 | Ono | ....................... | F02N 15/023 |
| | | | | 74/7 C |
| 2017/0045136 A1* | 2/2017 | Taga | ..................... | F16C 33/122 |

FOREIGN PATENT DOCUMENTS

| | | |
|---|---|---|
| GB | 946 060 A | 1/1964 |
| JP | S58-142066 A | 8/1983 |

OTHER PUBLICATIONS

Written Opinion of the International Searching Authority issued in PCT/FR2017/050404 dated May 29, 2017 (5 pages).

* cited by examiner

MOTOR VEHICLE STARTER PINION WITH IMPROVED ACOUSTIC PERFORMANCE

The present invention relates to a motor vehicle starter pinion with improved acoustic performance.

In order to start an internal combustion engine, in particular of a motor vehicle, it is known to use a rotary electrical machine in the form of a starter provided with a launcher which can transmit rotational energy of the starter to a crankshaft of the thermal engine by means of a starter ring gear.

For this purpose, the launcher is fitted such as to be mobile in translation on a drive shaft, between a position of rest in which the teeth of a drive pinion are released from the teeth of the starter ring gear, and a position of activation, in which the teeth of the drive pinion engage with the teeth of the starter ring gear.

In a known manner, the drive pinion and the ring gear of the engine have flanks with a profile with curvature extending in the manner of a circle. This geometric form is necessary in order to guarantee efficient transmission from the drive element to the driven element.

The strength of the teeth of the pinion, as well as silent driving, make it necessary to control the precision of the curvature on the useful flank of the profile, corresponding to the engagement area, in order to avoid impacts which give rise to noise and vibrations. However, there is a dispersion, such that the term fHalpha corresponding to a difference between the real profile and the theoretical profile expected can be negative or positive.

The applicant has shown that pinions with teeth with positive fHalpha, i.e. teeth which are thicker locally in the useful part of the profile, have better acoustic performance than pinions with negative fHalpha. This is due in particular to the resilient deformation of the tooth under the load, thus creating a variation of profile in comparison with the optimum theoretical profile.

The objective of the invention is to propose a simple definition of the tooth which makes it possible to obtain positive fHalpha teeth.

For this purpose, the invention relates to an assembly comprising:
- a ring gear of a thermal engine with a plurality of teeth, the said ring gear being defined by a modulus and a pressure angle;
- a starter comprising a pinion which can engage with the said ring gear of the said thermal engine, the said pinion having a plurality of teeth being defined by a modulus and a pressure angle, characterised in that a pinion product which is the product of the modulus of the said pinion and the cosine of the pressure angle of the said pinion is greater than a ring gear product equal to the product of the modulus of the said ring gear and the cosine of the pressure angle of the said ring gear.

Thus, the basic pitch is different at the top of the tooth of the pinion between the pinion and the ring gear.

Thus, on each tooth, the assembly comprises a form such that the product of the modulus of the said pinion and the cosine of the pressure angle of the said pinion is greater than a ring gear product equal to the product of the modulus of the said ring gear and the cosine of the reference pressure angle of the said ring gear, in order to obtain a different basic pitch at the top of the tooth of the pinion between the pinion and the ring gear.

Thus, by defining the pinion relative to corresponding values of the starter ring gear, the invention can easily be implemented during the production stage in order to obtain pinions with positive fHalpha. It is also found that the invention differs from the prior art according to which systematic equality is provided between the pinion product and the ring gear product.

Reference pressure angle means the pressure angle of the reference rack, whether it is theoretical (for example production by sintering) or in real production of the teeth by means of a rack.

According to one embodiment, the pressure angle at the active diameter of the foot of the ring gear is different from the pressure angle at the active diameter of the head of the tooth of the pinion.

According to another embodiment, in combination or not in combination with the preceding embodiment, the modulus of the pinion is different from the modulus of the ring gear.

According to one embodiment, the pinion and the ring gear are each made of a steel which is identical or different.

According to one embodiment, for a ring gear product of 2.070, the pinion product is between 2.079 and 2.084.

According to one embodiment, for a ring gear product of 2.387, the pinion product is between 2.401 and 2.41.

According to one embodiment, for a ring gear product of 2.415, the pinion product is between 2.425 and 2.431.

According to one embodiment, for all the teeth of the said pinion, a thickness of each height of tooth is greater by 35 to 45 micrometres than a thickness of a height of tooth of a pinion which would have its pinion product equal to that of the ring gear product. This makes it possible to compensate for the resilient deformation of the tooth under the load creating a variation of profile of the flank of the tooth.

According to one embodiment, for each tooth the said pinion has a thickness of a height of tooth of 2.012 mm plus or minus 0.036, and a thickness measured at a junction between a tooth root and a useful flank of 11.95 mm or minus 0.11[1].

[1] Translator's note: According to the claims, this should be "plus or minus 0.11".

According to one embodiment, an input face in the ring gear, of each tooth of the pinion, comprises beveling. This makes it possible to facilitate the insertion of each pinion tooth in the engagement space between two corresponding teeth of the ring gear.

According to one embodiment, the said pinion is of the sintered type.

According to one embodiment, the said pinion has been subjected to treatment by cementation.

According to one embodiment, the said pinion is obtained by cold heading.

The invention will be better understood by reading the following description and examining the figures which accompany it. These figures are provided purely by way of illustration and in no way limit the invention.

Elements which are identical, similar or analogous retain the same references from one figure to another.

Figure 1:
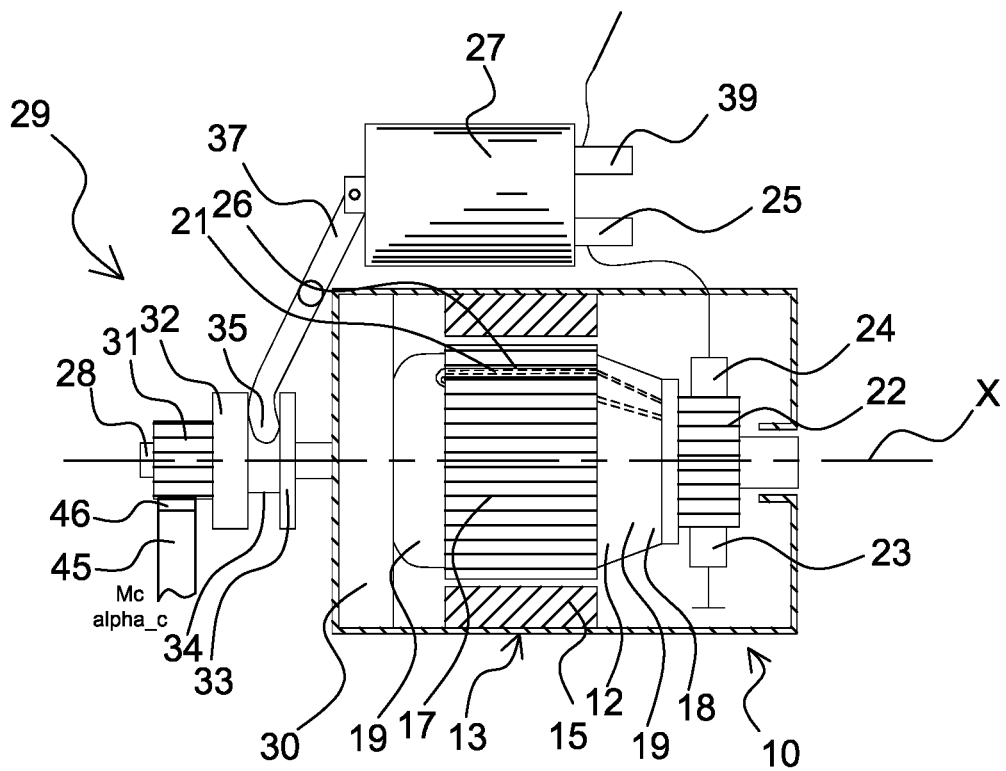
FIG. 1 is a schematic representation from the side of a thermal engine starter according to the present invention.

FIG. 1 represents schematically a starter 10 for a thermal engine of a motor vehicle. This direct current starter 10 comprises firstly a rotor 12, also known as an armature, which can rotate around an axis X, and secondly a stator 13, also known as an inductor, positioned around the rotor 12.

This stator 13 comprises a yoke supporting a series of permanent magnets 15, which are designed to produce an inductor field. The permanent magnets 15 are formed according to cylindrical segments, whilst being angularly distributed at regular intervals inside the yoke.

The rotor 12 comprises a rotor body 17 and a winding 18 wound in notches in the rotor body 17. The rotor body 17 consists of a set of metal plates with longitudinal notches 26. In order to form the winding 18, conductive wires in the form of a pin 21 are inserted in notches 26, generally on two distinct layers. The winding 18 forms chignons 19 on both sides of the rotor body 17.

The rotor 12 is provided at the rear with a collector 22 comprising a plurality of contact parts connected electrically to the conductive elements of the winding 18, which elements are formed by the pins 21 in the example concerned.

A group of brushes 23 and 24 is provided for the electrical supply to the winding 18, one of the brushes 23 being connected to the earth of the starter 10, and another one of the brushes 24 being connected to an electrical terminal 25 of a contactor 27.

The brushes 23 and 24 rub on the collector 22 when the rotor 12 is rotating, thus permitting the supply to the rotor 12 by switching of the electric current in the sections of the rotor 12.

In addition to the terminal 25 connected to the brush 24, the contactor 27 comprises a terminal 39, which is connected via an electrical connection element to an electrical supply of the vehicle, in particular a battery.

The starter 10 also comprises a launcher assembly 29, which is fitted such as to be mobile in translation on a drive shaft 28, and can be rotated around the axis X by the rotor 12.

A speed reducer 30 is interposed between a shaft of the rotor 12 and the drive shaft 28. The launcher assembly 29 comprises a drive element which is formed by a pinion 31, and is designed to be engaged on a drive unit of the thermal engine, such as a starter ring gear.

The launcher assembly 29 also comprises a free wheel 32 and a washer 33, which define between one another a groove 34 for receipt of the end 35 of a control lever 37. The control lever 37 is activated by the contactor 27, in order to displace the launcher assembly 29 relative to the drive shaft 28, along the axis X, between a first position, in which the launcher assembly 29 drives the thermal engine by means of the drive pinion 31, and a second position, in which the drive pinion 31 is disengaged from the starter ring gear of the thermal engine. During the activation of the contactor 27, an inner contact plate (not represented) makes it possible to establish a connection between the terminals 25 and 39, in order to switch on the electric motor. This connection will be cut off when the contactor 27 is deactivated.

Figure 2:
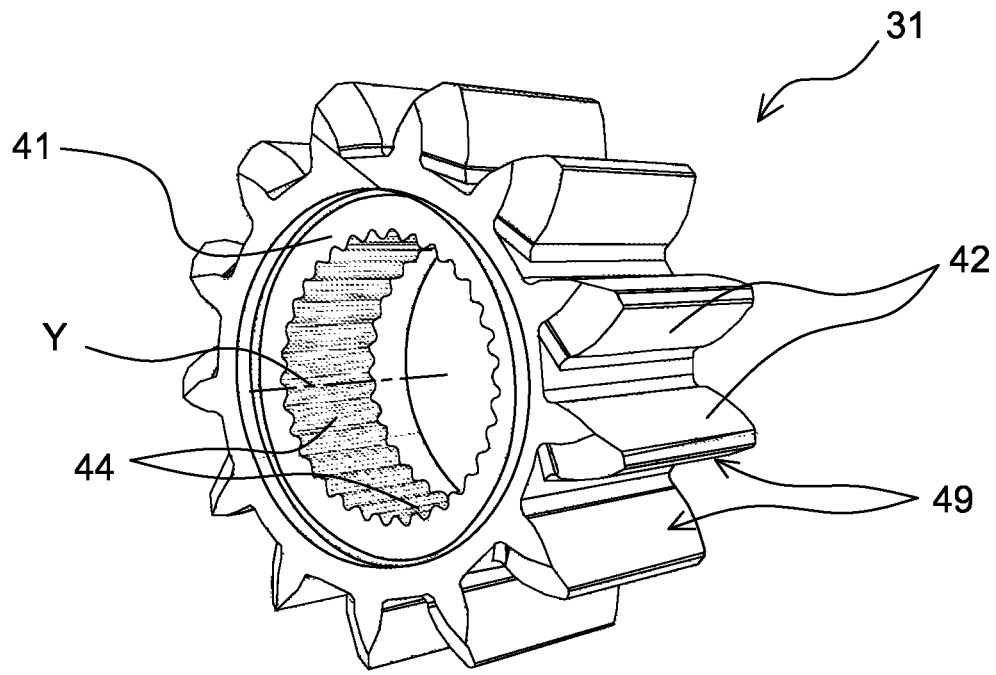
FIG. 2 is a view in perspective of a pinion according to the present invention.

FIG. 2 shows the pinion 31 with an axis Y which is designed to be engaged with the starter ring gear 45 of the thermal engine. This pinion 31 comprises a body 41 with a globally annular form provided with teeth 42 on its outer periphery. The pinion 31 comprises ribbing 44 on the inner periphery which is designed to cooperate with toothing with a corresponding form provided on the drive shaft 28. Two adjacent teeth 42 define between one another an engagement space in which a tooth 46 of the starter ring gear 45 is designed to be engaged.

Figure 3:
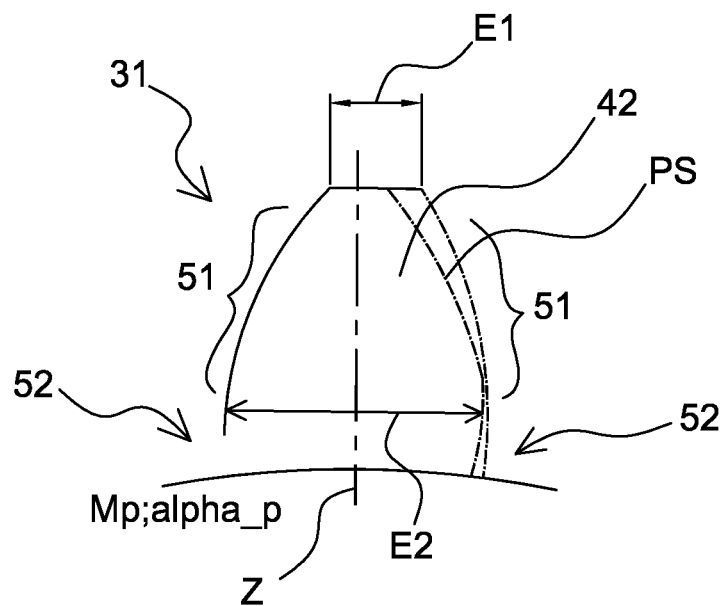
FIG. 3 is a detailed view of a tooth of the pinion according to the present invention, showing the difference between a tooth flank profile with positive fHalpha in comparison with a conventional tooth flank profile.

As can be seen in FIG. 3, each tooth 42 with an axis Z comprises two tooth flanks 49 which are opposite one another. Each flank 49 comprises a useful flank 51 which is designed to come into contact with a corresponding useful flank of the ring gear 45, and a tooth root 52 which extends from the corresponding useful flank 51.

The ring gear 45 is defined by a modulus Mc and a pressure angle alpha_c, whereas the pinion 31 is defined by a modulus Mp and a pressure angle alpha_p. The pinion product Mp*COS(alpha_p) equal to the product of the modulus of the pinion Mp and the cosine of the pressure angle of the pinion alpha_p is greater than the ring gear product Mc*COS(alpha_c) equal to the product of the modulus of the ring gear Mc and the cosine of the pressure angle of the ring gear alpha_c.

For the different types of ring gear 45 possible corresponding to the standard designs, pinion products are defined which make it possible to obtain pinions 31 with positive fHalpha according to the following table.

| Ring gear design | | | Positive fHalpha of the pinion Mp*COS(alpha_p) | |
|---|---|---|---|---|
| Modulus | Pressure angle | Product | | |
| Mc(mm) | Alpha_c(°) | Mc*COS(alpha_c) | Min | Max |
| 2.11667 | 12 | 2.070 | 2.079 | 2.084 |
| 2.54 | 20 | 2.387 | 2.401 | 2.41 |
| 2.5 | 15 | 2.415 | 2.425 | 2.431 |

There is definition of the basic pitch of the ring gear 45 and of the corresponding pinion 31, which are equal to the product of the modulus and the pressure angle multiplied by π according to the following table:

| Ring gear design | | Basic pitch - positive fHalpha of the pinion π*Mp*COS(alfa_p)[2] | |
|---|---|---|---|
| Pressure angle | Basic pitch | | |
| Alpha_c(°) | π*Mc*COS(alfa_c) | Min | Max |
| 12 | 6.504 | 6.531 | 6.547 |
| 20 | 7.498 | 7.543 | 7.571 |
| 15 | 7.586 | 7.618 | 7.637 |

[2]Translator's note:
Starting from this point on the present page, the spelling "alfa" is used, rather than "alpha" as previously. The same spelling as in the original text has been used in the translation.

As can be seen clearly in FIG. 3, in comparison with the standard profile PS of a tooth flank 49 with a pinion product Mp*COS(alfa_p) equal to the ring gear product Mc*COS(alfa_c), the tooth 42 of the pinion 31 according to the invention is thicker in the upper part. Thus, for all the teeth 42 of the pinion 31, a thickness E1 of each height of tooth is greater by 35 to 45 micrometres than the thickness of a height of tooth of the pinion 31 which would have its pinion product equal to that of the ring gear product.

According to one embodiment, for each tooth, the pinion 31 has a thickness E1 of height of tooth of 2.012 mm plus or minus 0.036, and a thickness E2 measured at the junction between a tooth root and a useful flank of 11.95 mm plus or minus 0.11.

Figure 4:
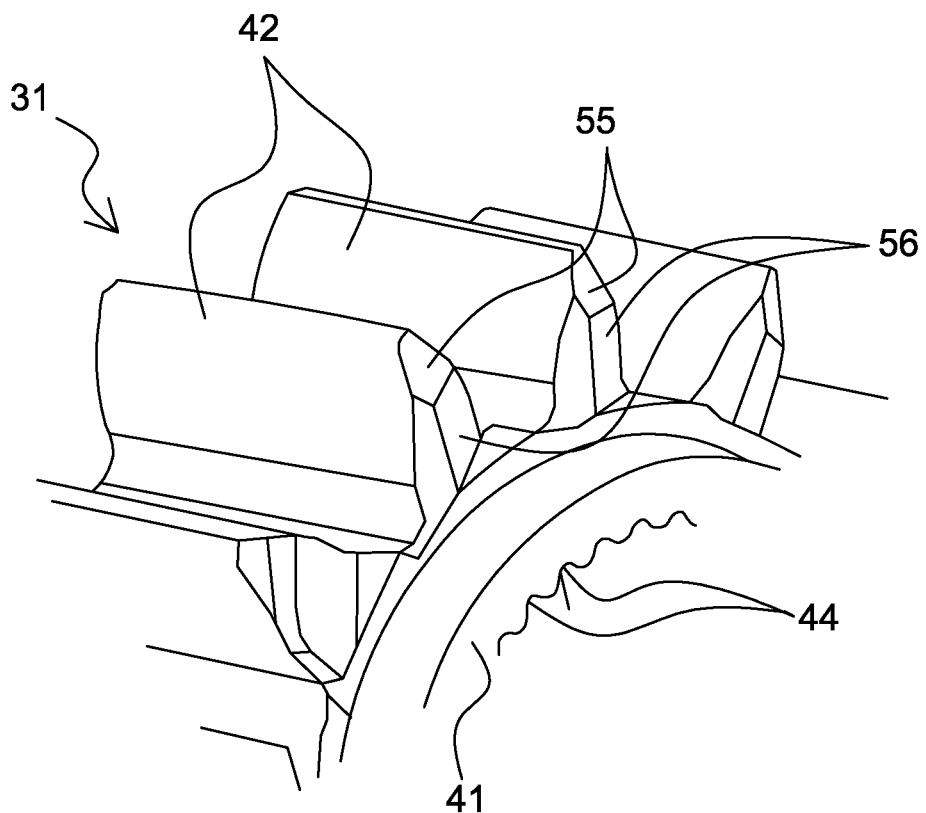
FIG. 4 is a partial view in perspective of a pinion according to the present invention illustrating the bevelled form provided on the input face of the teeth.

As can be seen clearly in FIG. 4, an input face in the ring gear, of each tooth 42 of the pinion, comprises beveling 55 in order to facilitate the insertion of each pinion tooth 42 in the engagement space between two corresponding teeth 46 of the ring gear 45. This beveling 55 is provided on an axial end face 56 of each tooth 42 with an orientation which is radial relative to the axis Y of the pinion 31.

In order to obtain the form of the pinion 31 easily, the pinion 31 can be a sintered pinion obtained by compacting a powder based on iron and carbon in an appropriate mould.

In addition, in order to improve its mechanical strength, the pinion 31 can be subjected to treatment by cementation. This operation consists of thermochemical treatment, i.e. it is a high-temperature heat treatment which is accompanied by modification of the chemical composition of the basic alloy by enrichment and diffusion of carbon provided by an atmosphere of the furnace which is rich in a carbon element. Since the pinion 31 to be treated is in contact with this atmosphere rich in carbon in the treatment furnace, the carbon will then enrich the surface and subsequently be diffused to a certain depth, thus creating a gradient of concentration of carbon which decreases from the surface and to a certain depth, until the initial carbon content of the alloy is obtained once more.

Once this high-temperature step has been carried out, a quenching operation will then be carried out consisting of a stage of sudden cooling of the part. This will make it possible to obtain transformations of metallurgical structures and modifications of hardness in order to obtain a hardness profile which decreases in the entire cemented surface layer (from the surface and to a certain depth). Finally, the parts are not left in the untreated quenched state (otherwise they would be very fragile). The parts are subjected to a stress-relieving anneal which has a slight impact on the hardness on the surface and in its vicinity, i.e. to a depth of approximately 0.2 mm for example, but not on the remainder of the hardness profile.

Alternatively, the pinion 31 is obtained by cold heading.

It will be appreciated that the foregoing description has been provided purely by way of example, and does not limit the field of the invention, a departure from which would not be constituted by replacing the different elements by any other equivalents.

The invention claimed is:

1. An assembly comprising:
   a ring gear of a thermal engine with a plurality of teeth, the ring gear being defined by a modulus and a pressure angle;
   a starter comprising a pinion which can engage with the ring gear of the thermal engine, the pinion having a plurality of teeth being defined by a modulus and a pressure angle,
   wherein a pinion product which is the product of the modulus of the pinion and the cosine of the pressure angle of the pinion is greater than a ring gear product equal to the product of the modulus of the ring gear and the cosine of the pressure angle of the ring gear, and wherein, for a ring gear product of 2.070, the pinion product is between 2.079 and 2.084.

2. The assembly according to claim 1, wherein, for all teeth of the pinion, a thickness measured at a top of each tooth is greater by 35 to 45 micrometres than a thickness measured at a top of a tooth of a pinion which would have its pinion product equal to that of the ring gear product.

3. The assembly according to claim 1, wherein for each tooth the pinion has a thickness measured at a top of tooth of 2.012 mm plus or minus 0.036, and a thickness measured from one useful flank to another useful flank at a tooth root of 11.95 mm, plus or minus 0.11.

4. The assembly according to claim 1, wherein an input face in the ring gear, of each tooth of the pinion comprises beveling.

5. The assembly according to claim 1, wherein the pinion is of the sintered type.

6. The assembly according to claim 5, wherein the pinion has been subjected to treatment by cementation.

7. The assembly according to claim 1, wherein the pinion is obtained by cold heading.

8. An assembly comprising:
   a ring gear of a thermal engine with a plurality of teeth, the ring gear being defined by a modulus and a pressure angle;
   a starter comprising a pinion which can engage with the ring gear of the thermal engine, the pinion having a plurality of teeth being defined by a modulus and a pressure angle,
   wherein a pinion product which is the product of the modulus of the pinion and the cosine of the pressure angle of the pinion is greater than a ring gear product equal to the product of the modulus of the ring gear and the cosine of the pressure angle of the ring gear, and
   wherein, for a ring gear product of 2.387, the pinion product is between 2.401 and 2.41.

9. An assembly comprising:
   a ring gear of a thermal engine with a plurality of teeth, the ring gear being defined by a modulus and a pressure angle;
   a starter comprising a pinion which can engage with the ring gear of the thermal engine, the pinion having a plurality of teeth being defined by a modulus and a pressure angle,
   wherein a pinion product which is the product of the modulus of the pinion and the cosine of the pressure angle of the pinion is greater than a ring gear product equal to the product of the modulus of the ring gear and the cosine of the pressure angle of the ring gear, and
   wherein, for a ring gear product of 2.415, the pinion product is between 2.425 and 2.431.

* * * * *